US009236598B2

(12) United States Patent (10) Patent No.: US 9,236,598 B2
Unger (45) Date of Patent: Jan. 12, 2016

(54) COATED ELECTRODES

(75) Inventor: Terence W. Unger, San Diego, CA (US)

(73) Assignee: Terence W. Unger, Santa Cruz, CA (US)

( * ) Notice: Subject to any disclaimer, the term of this patent is extended or adjusted under 35 U.S.C. 154(b) by 309 days.

(21) Appl. No.: 13/373,353

(22) Filed: Nov. 12, 2011

(65) Prior Publication Data

US 2014/0101921 A1 Apr. 17, 2014

Related U.S. Application Data

(60) Provisional application No. 61/412,891, filed on Nov. 12, 2010.

(51) Int. Cl.
*H01M 4/04* (2006.01)
*C25B 11/04* (2006.01)
*H01M 4/88* (2006.01)

(52) U.S. Cl.
CPC .............. *H01M 4/04* (2013.01); *C25B 11/04* (2013.01); *H01M 4/0416* (2013.01); *H01M 4/0421* (2013.01); *H01M 4/88* (2013.01); *H01M 4/8846* (2013.01); *H01M 4/8867* (2013.01); *Y02E 60/50* (2013.01); *Y10T 29/49888* (2015.01)

(58) Field of Classification Search
CPC ....................................................... H01M 4/00
USPC ............ 502/101, 185; 427/58, 115, 180, 457, 427/471, 598; 429/208, 209
See application file for complete search history.

(56) References Cited

U.S. PATENT DOCUMENTS

| 6,423,194 | B1 * | 7/2002 | Furuya | 204/284 |
| 8,437,104 | B2 * | 5/2013 | Winarski | 360/135 |
| 8,507,032 | B2 * | 8/2013 | Winarski | 427/547 |
| 8,817,422 | B2 * | 8/2014 | Winarski | 360/135 |
| 2007/0134531 | A1 * | 6/2007 | Kimura et al. | 429/32 |
| 2012/0132930 | A1 * | 5/2012 | Young et al. | 257/84 |
| 2013/0052343 | A1 * | 2/2013 | Dieny et al. | 427/212 |

* cited by examiner

*Primary Examiner* — Patricia L Hailey

(74) *Attorney, Agent, or Firm* — David Lewis; Ashok Tankha

(57) ABSTRACT

A porous ceramic electrode with metallic coating and a high quantity of iron particles/iron alloys is applied to the top side of the wet (not dried) ceramic electrode, which forms first layer of a bonding process for metallic bonding to ceramics. Iron particles are added to a wet porous ceramic electrode and then attracted to one side of the electrode with a magnetic field; by turning a magnet on and drawing doped iron particles to the bottom side of the ceramic electrode. The iron particles are doped with a bonding agent to improve bonding the ceramic electrode to a second layer of metals. The second layer of metallic coating is a material that improves efficiently of the electrode on products such as fuel cell electrodes, hydrogen generator electrodes and batteries. The second coating may be applied using the atomic layer deposition method or vapor deposition.

20 Claims, 5 Drawing Sheets

COATED ELECTRODES

CROSS REFERENCE TO RELATED APPLICATIONS

This is a continuation of provisional application Ser. No. 61/412,891, filed on Nov. 12, 2010.

STATEMENT REGARDING FEDERALLY SPONSORED RESEARCH OR DEVELOPMENT

Not Applicable

DESCRIPTION OF ATTACHED APPENDIX

Not Applicable

FIELD

This specification relates to the structure and method of making electrodes.

BACKGROUND

The problem with using ceramic electrodes has been that the previous designs were not durable; previous designs fall apart easily when stressed for long periods of time. The problem with the prior ceramic designs is that the metal is not able to bond to the ceramic electrode very well.

BRIEF SUMMARY

This specification relates generally to the field of the design of electrodes and more specifically to metallic coatings on ceramic electrodes. The electrodes of this specification could be used for hydrogen generation, fuel cells, or batteries. This specification provides a better method of bonding metals to ceramic electrodes.

Techniques are disclosed herein that improve the bonding of metals to the ceramic electrode and increases the efficiency of the electrodes.

Other objects and advantages of the present invention will become apparent from the following descriptions, taken in connection with the accompanying drawings, wherein, by way of illustration and example, embodiments of the present invention are disclosed. In accordance with embodiments of the invention, there are disclosed Metallic Coated Ceramic Electrodes including a novel magnetic deposition method of iron particles to be infused on the ceramic electrode.

BRIEF DESCRIPTION OF THE DRAWINGS

The drawings constitute a part of this specification and include examples of embodiments to the invention, which may be embodied in various forms. It is to be understood that in some instances various aspects of the invention may be shown exaggerated or enlarged to facilitate an understanding of the invention.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Figure 1:
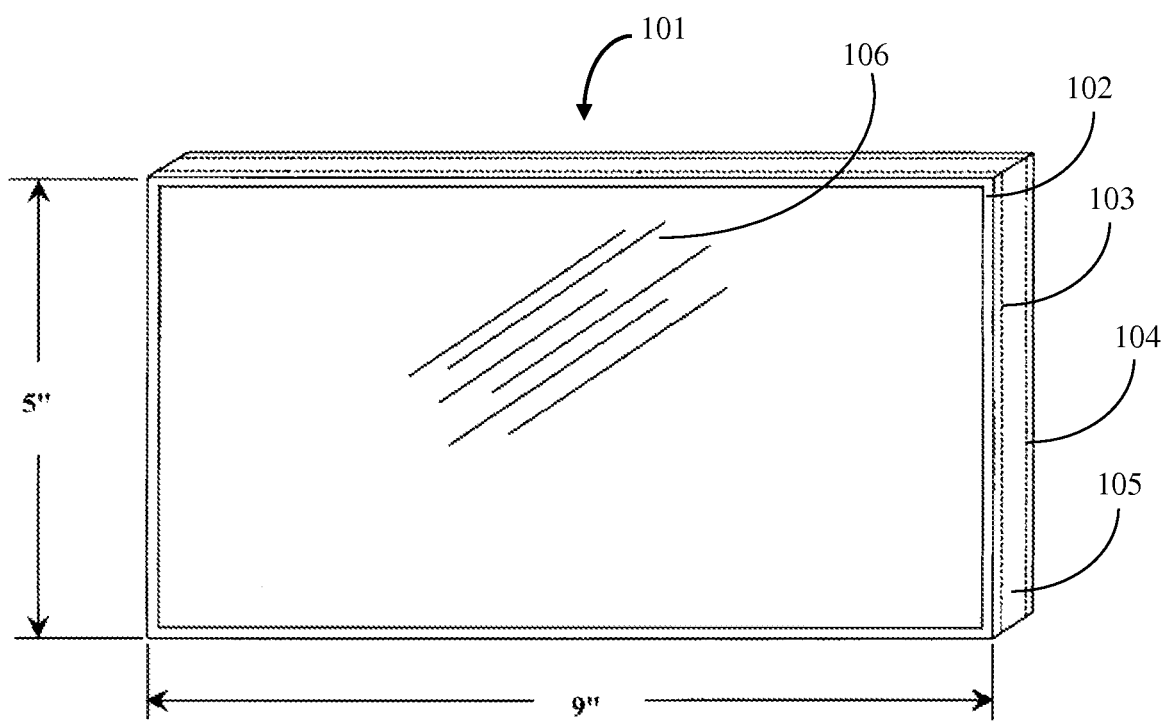
FIG. 1 shows a view of the electrode and the layers of metallic deposition and of the borderline that is plated with a thick metallic substance, such as nickel or a nickel alloy, that connects the front of the electrode to the back of the electrode.

FIG. 1 shows a view of the electrode 101 and the layers of metallic deposition and of the borderline that is plated with a thick metallic substance, such as nickel or a nickel alloy, that connects the front of the electrode 103 to the back of the electrode 104. The electrode 101 has approximately ¼ solid plate borderline.

Figure 2:
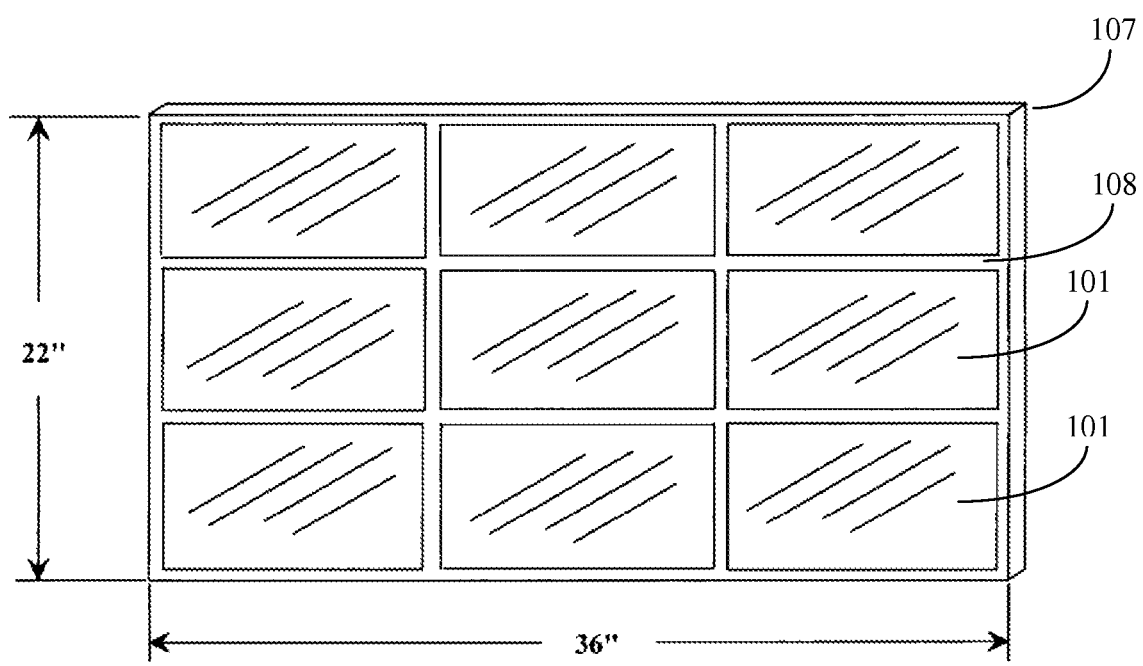
FIG. 2 is a view of a ceramic electrode frame that is on the outside of a small connector that is connected to the larger frame, which has many smaller electrode connectors.

FIG. 2 is a view of a ceramic electrode frame that is on the outside of a small connector that is connected to the larger frame, which has many smaller electrode connectors. All the small electrodes are put together into a larger frame.

Figure 3:
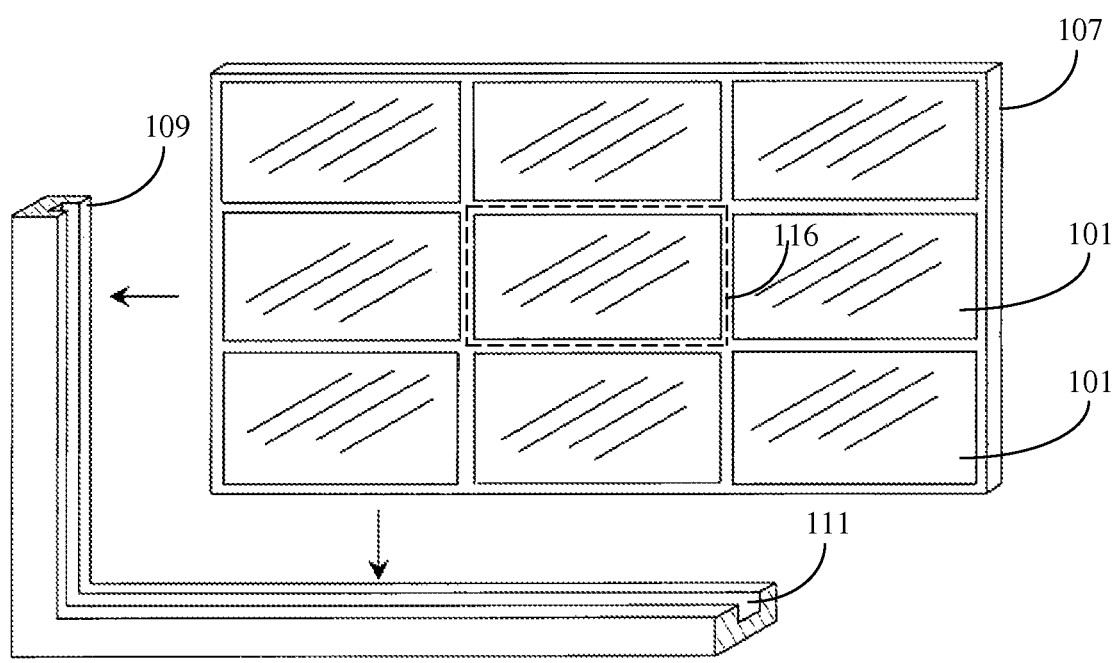
FIG. 3 is a view of a series of ceramic electrode connectors in parallel which is designed to insert one electrode into the connector.

FIG. 3 is a view of a series of ceramic electrode connectors in parallel which is designed to insert one electrode into the connector. The connector resembles a circuit board edge connector that connects the circuit boards circuits to the appropriate pins on the connector. The connectors are in a frame that resembles a window pane with many different sections.

Figure 4:
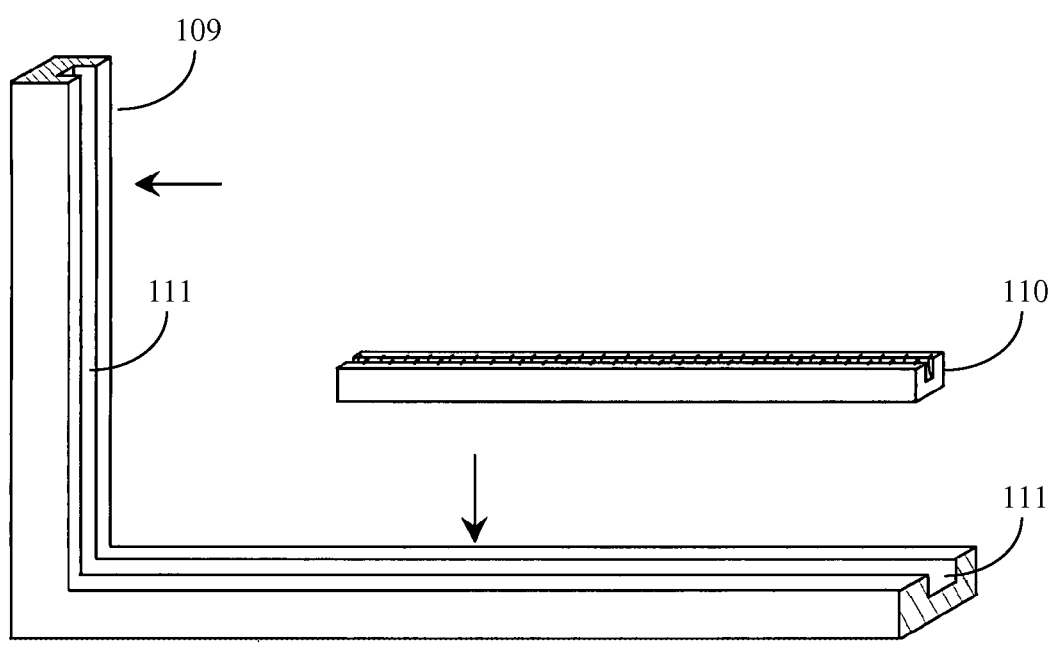
FIG. 4 is a view of one small segment of the frame which holds one electrode with the approximate size of 5"×9".

FIG. 4 is a view of one small segment of the frame, which holds one electrode with the approximate size of 5"×9".

Figure 5:
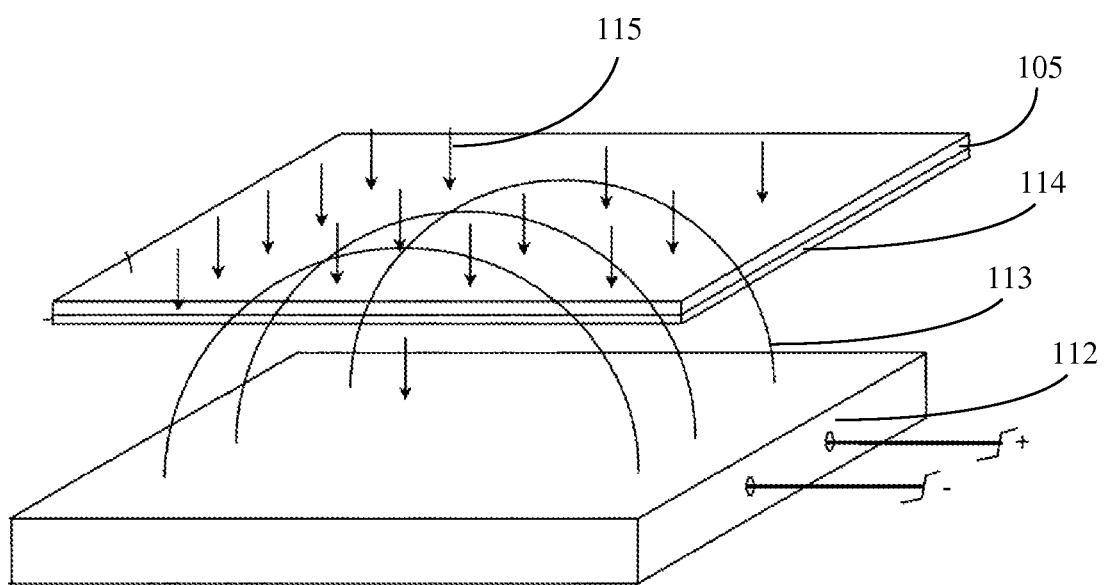
FIG. 5 is a view of the electro magnet and the electrode with wet un-dried ceramic mix with the iron particles being applied to the top side and then attracted and embedded onto the bottom side of the ceramic electrode from the magnetic flux force.

FIG. 5 is a view of the electro magnet 112 and the electrode with wet un-dried ceramic mix with the iron particles being applied to the top side and then attracted and embedded onto the bottom side of the ceramic electrode from the magnetic flux force 113 causing the iron particles and/or iron-alloy particle to travel in direction 115.

The electrode design, disclosed herein, enhances the efficiency and the durability of electrodes for hydrogen generators, (electrolysis cells) fuel cells, batteries, and similar objects that may benefit from a metallic coated ceramic electrode A first step that improves efficiency is to use a porous ceramic electrode 105 coated with metallic substances. The use of porous ceramic electrode 105 coated with metallic substances makes it easier for the atoms and electrons to move through the electrode material with less resistance. Since the atoms and electrons move through the porous ceramic with less resistance, less power is dissipated, and energy may be produced more efficiently. Iron particles and/or iron-alloy particles are deposited and impregnated into the porous ceramic electrode 105 coated with metallic substances in a wet (undried) ceramic electrode, which makes a second deposition of metallic substances more durable, and improves the bond between the second layer 106 of metallic substances and the ceramic electrode 105 (as mentioned above, the use of the porous ceramic electrode 105 increases the efficiency of generating power with the electrode 101). Iron particles or iron-alloys may be applied to the top side 103 and/or the bottom side 104 of a wet ceramic electrode 105, which helps the bonding of second metallic deposition 106 on the ceramic electrode 105 (see FIG. 1). Very small doped iron particles are applied to the top side of a wet ceramic electrode 105 and then a magnet is turned on at the bottom side of the electrode 104, which attracts the iron particles to the bottom side of the electrode (see FIG. 3A). As a result of the magnetic field 113, the iron particles embed in the wet ceramic electrode 105. The magnet's (112) magnetic force attracts the iron particles towards the bottom side 104 of the electrode where the electro magnet 112 is located. The iron particles are doped with bonding agents to bond to the ceramic electrode 105 to the second layer 106 of metal. The bonding agent improves the bonding of the second coat of metals, which is eventually deposited on the top side 103 and/or the bottom side 104 of ceramic electrode 105. Bonding agents are applied to the bottom side of the electrode and/or the top side 103 of the electrode where the iron particles and/or iron-alloy particles have been deposited (to bond with new second layer 106 of metals that will eventually be deposited). Next, another bonding agent is applied to the iron particles that are on the bottom 104 and/or top side 103 of the electrode to help the bonding of the second metallic layer 106 added to the electrode 101. Next the second layer 106 of metals is deposited on the combination of the ceramic electrode 105 having the iron particles embedded therein. The second layer 106 may be deposited via methods, such as atomic layer deposition or vapor deposition. The iron particle can be sprinkled on the top side of the electrode 105, and then the electrode 101 can be aggregated to get the iron particles embedded in the wet ceramic electrode 105. Alternatively, the top side 103 of the electrodes are embedded and coated with doped iron particles by turning on the magnet on the bottom side for a short period of time, so that the iron particles are embedded in the top side of the ceramic electrode 105. The edge of the electrode has a solid metallic coating 102, such as nickel all around the edge of the ceramic electrode 105. The solid metallic coating connects the front 103 to the back 104 of the electrode. The metallic coating 102 may be thick. The solid metallic coating forms a border all around the electrode. The metallic coating 102 electrically connects the front 103 and the back 104 of the ceramic electrode 105. Using the metallic coating to connect the front 103 of the electrode 101 to the back 104 of the electrode 101 makes the electrode 101 more durable (see FIG. 1)

The electrode design is rectangular in shape and is divided into an array 107 of frames 110, which resemble a house window that has many small window panes in the frame 110. Each individual electrode 101 is removably attached to a connecting framework 108, which operably connects to the layer of solid metal 102 on each of the individual electrodes 101. The connecting framework 108 is attached on a support framework 109, also in a removable manner (FIG. 3).

The electrode may be any shape. The electrode design may be rectangular as shown in FIG. 1. The electrode of FIG. 1 is approximately ⅛ of an inch thick, but could be any size. Another novel design of the electrodes includes carbon nanotubes (CNTs) that are coated with metallic materials to increase the efficiency of the electrodes. The magnetic deposition of iron particles to form a first metallic layer of metallic is combined with applying a forest of nano ALD metallic coated CNTs. In other words, many rows and columns are applied and built upon each other. The rows and columns of CNTs are wound tightly around the central axis of the center of the electrode 101 from one end of the electrode to the other, such as north to south for many layers then east to west on the electrode for many layers. The CNTs act as the primary second layer that is deposited on to the ceramic electrode. In the case of hydrogen generator electrodes the CNTs are plated with a nano metallic catalyst, such as palladium to improve the efficiency of generating hydrogen. After the CNTs are deposited, multiple layers of graphene are wrapped all around the CNT plated electrode. The graphene helps the deposited metals stay bonded to the ceramic electrode. The graphene helps bond the various layers of the electrode together and bond to the ceramic. The CNTs and the graphene are manufactured from nano materials that are approximately 10 nano meters in width (which is too small to draw to scale). The smaller electrodes are snapped into an electrode connector which resembles a circuit board connector that has many fingers that apply tension holding the smaller electrodes in place and provide electrical conductivity between the smaller electrodes similar to a circuit board, refer to FIG. 3 to see the connector. The individual electrode connector frame 116 (FIG. 3) has the fingers. The connecting framework 108 sits on the connecting channel 111 of the support framework 109 (FIG. 3). The small electrode's connector frame is shown in FIG. 2B. The large electrode is divided up into parts, so that the individual small electrodes can be manufactured easily, and inexpensively. After the small electrodes are formed the small electrode are put them together to form a large electrode frame (shown in FIG. 2), by building the larger electrode from many smaller electrodes, which helps make the large (e.g., square) electrode more durable, so that the larger electrode is less likely to break and crack.

1. To review, iron particles and/or iron-alloys particles are deposited on, and impregnated via, the top side and/or the bottom side of a wet ceramic electrode (un-dried), to help the bonding of a second layer of metallic depositions on to the ceramic electrode.

a. For example, very small iron particles are applied to the top side of a wet ceramic electrode, and then a magnet is turned on at the bottom side of the electrode. The magnet attracts the iron particles to the bottom side of the electrode, causing the iron particles and/or iron-alloy particles to embed into the bottom of the ceramic electrode.

b. The iron particles and/or alloys are applied on the top side of the electrode. Then the particles on the electrode can be aggregated (via the application of the magnetic field) to get the iron particles and/or iron alloy embedded in the wet ceramic electrode into the top side of the electrode. The top side of the electrode is embedded and coated with the iron particles by turning on the magnet for a short period of time so that the iron particles embed in the top side of the ceramic electrode.

c. The edge of the electrode has a solid metallic coating such as nickel, all around the edge of the electrode (on the edge of the ceramic electrode). The solid metallic coating on the edge of the ceramic electrode connects the front of the electrode to the back of the electrode. The metallic coating electrically connects the back of the ceramic electrode to the front of the ceramic electrode giving the electrode more durability. The metallic coating may form a border all around the electrode.

d. Another solid metallic plating of a substance, such as nickel forms a border all around the electrode improving the durability of that portion of the electrode. The portion of the electrode having the second solid metallic plating is inserted into the electrode connector similar to the manner in which a printed circuit board is inserted into a printed circuit board connector.

2. In another design, carbon nanotubes (CNTs) that have ALD coated metallic materials on them are included in the electrode to increase the efficiency of the electrodes. A forest of CNTs is applied. In other words, many rows and columns are applied. The rows and columns are built upon each other wrapped around a central axis in the center of the electrode tightly around the ceramic electrode. For example, the CNTs are wrapped from north to south from one end of the electrode to the other end of the electrode. Then the CNTs are wrapped from east to west on the electrode from one end of the electrode from one end of the electrode to the other end of the electrode. The CNTs will act as the primary second layer of metal that is deposited onto the ceramic electrode.

a. In the case of hydrogen generators, the second layer having the CNTs, which are deposited include a nano metallic catalyst, such as palladium. The catalyst may be deposited using the atomic layer deposition methods.

b. Then, after the second layer is deposited, graphene is wrapped all around the electrode. The graphene helps the deposited metals stay bonded to the ceramic electrode, and graphene helps bond the metallic layers to the ceramic of the ceramic electrode and helps the metallic layers and the porous ceramic stay together.

3. The electrodes may be rectangular in shape and the electrode is divided up into frames, which may resemble a house window that has many small window panes in the window. The frame is made from a ceramic and the frame is very thin. The large electrode is divided up into parts (contained in the frames), so that individual small electrodes can be easily manufactured with less likelihood of breaking during manufacture, and then the smaller electrodes are put together (via the frames) to form a large electrode. Constructing the larger electrode from smaller electrodes also helps make the larger (e.g., rectangular) electrode more durable, and less likely to break and crack, despite a larger electrode being a thin metallic coated ceramic device. The electrode could be any shape or thickness.

a. The thin small electrode will be easy to assemble and snapped into the ceramic frame, by snapping the small electrodes into the connectors of the frame. The assembly of smaller electrodes, when placed in the frames are electrically connected, so as to behave electrically as one solid conductive piece when put together. The electrodes may be put together by snapping the electrodes into part of a frame, which resembles a circuit board connector that has many fingers. The fingers of the frame apply tension and provide electrical conductivity to the electrode, similar to a circuit board.

b. The iron particles and/or iron alloy are/is doped with bonding agents to bond to the ceramic and the other end of the iron particle will have doping that will be applied to the iron particles to help the bonding of the second (or next) deposition of metals on the combination of the iron particles (and/or iron alloys) and the ceramic electrode.

c. Bonding agents are applied to the bottom side of the electrode where the iron particles have been deposited to bond with second layer of metals that will be deposited.

d. The second layer of metals is applied to the ceramic electrode using atomic layer deposition. The second layer bonds with the first layer of doped iron particles or doped iron alloys (which was deposited via magnetic deposition), to form a more durable bond of the second layer onto the ceramic electrode.

e. The second layer may be applied to the ceramic electrode, via vapor deposition. The vapor deposition bonds the second layer with the first layer (which was deposited via magnetic deposition) of doped iron particles and/or doped iron alloy to form a more durable bond to the ceramic electrode.

CONCLUSION

Enhancements in ceramic electrode designs described herein, improve the bonding of metals to ceramic electrodes, making the electrodes more durable, so that the electrodes last longer and operate with at a higher efficiency which will help the U.S.A. become number one in clean energy technology, helping the struggling economy. Alternative-fuel hydrogen is a good partial solution for the global warming problem that the Earth will be experiencing in the near future.

What is claimed is:

1. An electrode, comprising:
 a rectangular solid metallic frame having a solid metallic edge;
 a plurality of layers of carbon nano tubes wrapped on said solid metallic edge; and
 said plurality of layers of carbon nano tubes bonded to said solid metallic edge by a bonding agent.

2. The electrode of claim 1, wherein said solid metallic edge is formed using chemical vapor deposition of a metallic material.

3. The electrode of claim 2, the metallic material being nickel.

4. The electrode of claim 1, wherein the solid metallic edge is a separate metallic frame.

5. The electrode of claim 1, the bonding agent being deposited by atomic layer deposition.

6. The electrode of claim 1, further comprising:
 a porous ceramic electrode;
 the plurality of layers being applied to the porous ceramic electrode.

7. The electrode of claim 6, the porous ceramic electrode including a porous ceramic that is an insulator.

8. The electrode of claim 1, further comprising a layer of graphene wrapped on the electrode.

9. The electrode of claim 1, being an electrode assembly comprising:
 a plurality of component electrodes, each of the plurality of component electrodes including at least
  the rectangular solid metallic frame having the solid metallic edge, and
  the plurality of layers of carbon nanotubes wrapped on said solid metallic edge; and
 a support structure, including at least
  a plurality of windows, and
  a plurality of connectors;
 the plurality of component electrodes being attached to the plurality of windows and connected to the plurality connectors; and
 the plurality of connectors electrically connecting the plurality of component electrodes to one another, so that the plurality of component electrodes of the electrode assembly behave as one electrode.

10. A porous ceramic based electrode, comprising:
 a porous ceramic substrate, wherein said substrate exposes at least two flat surfaces;
 a first layer of iron particles bonded on said at least one of said flat surfaces of said porous ceramic substrate, wherein said iron particles are imbedded in said porous ceramic substrate using magnetics from the underside of said substrate;

one or more secondary layers deposited over said at least one flat surface comprising said first layer of bonded iron particles, wherein each of said secondary layer comprises one of:
one or more layers of carbon nanotubes; and
one or more layers of graphene.

11. The porous ceramic substrate of claim 10, further comprising a solid metallic layer deposited over said one or more secondary layers on the periphery of said flat surfaces for providing an electrical contact to said porous ceramic substrate.

12. The porous ceramic based electrode of claim 10, wherein said graphene and said carbon nanotubes are manufactured from nano materials that are about 10 nanometers in width.

13. The porous ceramic based electrode of claim 10, wherein each unit of said porous ceramic based electrode is configured as an array of porous ceramic electrodes, and wherein said array of porous ceramic electrodes are operably connected to form a larger porous ceramic electrode.

14. The porous ceramic based electrode of claim 10, wherein the one or more secondary layers include at least one or more layers of carbon nanotubes.

15. The porous ceramic based electrode of claim 10, wherein the one or more secondary layers include at least one or more layers of a graphene.

16. The porous ceramic based electrode of claim 10, the secondary layer being bonded to the metallic edge; and the porous ceramic based electrode not having a substrate other than the porous ceramic substrate.

17. The porous ceramic based electrode of claim 10, the secondary layer including a plurality of layers having at least a first layer deposited in a first direction and a second layer deposited in a second direction, the secondary layer being wrapped around the electrode and bonded to the metallic edge.

18. The electrode of claim 10, the porous ceramic electrode including a porous ceramic that is an insulator.

19. A porous ceramic based electrode, comprising:
a porous ceramic substrate, wherein said substrate exposes at least two flat surfaces;
a first layer of iron particles bonded on said at least one of said flat surfaces of said porous ceramic substrate, wherein said iron particles are imbedded in said porous ceramic substrate using magnetics from the underside of said substrate;
one or more secondary layers deposited over said at least one flat surface comprising said first layer of bonded iron particles, wherein each of said secondary layer includes at least a layer of a catalyst.

20. The porous ceramic based electrode of claim 19, wherein said catalyst is metallic.

* * * * *